United States Patent
Chaney et al.

(10) Patent No.: US 12,045,769 B2
(45) Date of Patent: Jul. 23, 2024

(54) AUTONOMOUS STORAGE AND RETRIEVAL TOWER

(71) Applicant: Walmart Apollo, LLC, Bentonville, AR (US)

(72) Inventors: Joshua Wayne Chaney, Gentry, AR (US); Edwin H. Reed, Bentonville, AR (US); Paul E. Durkee, Centerton, AR (US); Bradley Johnson, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/235,701

(22) Filed: Aug. 18, 2023

(65) Prior Publication Data

US 2023/0394425 A1    Dec. 7, 2023

Related U.S. Application Data

(63) Continuation of application No. 16/507,988, filed on Jul. 10, 2019, now abandoned.

(60) Provisional application No. 62/697,301, filed on Jul. 12, 2018.

(51) Int. Cl.
| | |
|---|---|
| *G06Q 10/08* | (2024.01) |
| *G06F 21/31* | (2013.01) |
| *G06Q 10/0833* | (2023.01) |
| *G06Q 10/0836* | (2023.01) |
| *G07F 9/00* | (2006.01) |
| *G07F 17/12* | (2006.01) |

(52) U.S. Cl.
CPC ......... *G06Q 10/0836* (2013.01); *G06F 21/31* (2013.01); *G06Q 10/0833* (2013.01); *G07F 9/001* (2020.05); *G07F 9/002* (2020.05); *G07F 17/12* (2013.01)

(58) Field of Classification Search
CPC ............ G06Q 10/0836; G06Q 10/0833; G07F 9/001; G07F 9/002; G07F 17/12; G06F 21/31
USPC .......................................... 705/339; 235/380
See application file for complete search history.

(56) References Cited

U.S. PATENT DOCUMENTS

| | | | |
|---|---|---|---|
| 3,737,057 | A | 6/1973 | Neumann |
| 5,065,872 | A | 11/1991 | Simon |
| 5,337,920 | A | 8/1994 | Clausen |
| 5,478,182 | A | 12/1995 | Hildebrand |
| 5,568,393 | A | 10/1996 | Ando |
| 5,593,269 | A | 1/1997 | Bernard, II |

(Continued)

FOREIGN PATENT DOCUMENTS

| | | |
|---|---|---|
| CN | 106942915 A | 7/2017 |
| CN | 107346590 | 11/2017 |

(Continued)

OTHER PUBLICATIONS

Nicole Dube, "E-Cigarettes and Minors", Jan. 19, 2018,cga.ct.gov, 4 pages. (Year: 2018).*

(Continued)

*Primary Examiner* — Shannon S Campbell
*Assistant Examiner* — Freda A Nelson
(74) *Attorney, Agent, or Firm* — Fitch, Even, Tabin & Flannery, LLP

(57) ABSTRACT

Method and systems for an autonomous storage and retrieval tower integrated with a fulfillment system.

18 Claims, 6 Drawing Sheets

(56) References Cited

U.S. PATENT DOCUMENTS

| | | | |
|---|---|---|---|
| 5,674,040 | A | 10/1997 | Wagner |
| 6,224,313 | B1 | 5/2001 | Fukushima |
| 6,325,775 | B1 | 12/2001 | Thom |
| 6,409,449 | B1 | 6/2002 | Freudelsperger |
| 6,416,270 | B1 | 7/2002 | Steury |
| 6,443,317 | B1 | 9/2002 | Brozak, Jr. |
| 6,598,829 | B2 | 7/2003 | Kamstra |
| 6,694,217 | B2 | 2/2004 | Bloom |
| 6,783,058 | B2 | 8/2004 | Quaintance |
| 6,845,873 | B1 | 1/2005 | Chattey |
| 6,882,269 | B2 | 4/2005 | Moreno |
| 7,010,501 | B1 | 3/2006 | Roslak |
| 7,013,198 | B2 | 3/2006 | Haas |
| 7,086,558 | B1 | 8/2006 | Pixley |
| 7,106,202 | B2 | 9/2006 | Dickinson |
| 7,324,921 | B2 | 1/2008 | Sugahara |
| 7,360,042 | B2 | 4/2008 | Chen |
| 7,870,029 | B2 | 1/2011 | Bates |
| 8,145,351 | B2 | 3/2012 | Schininger |
| 8,502,644 | B1 | 8/2013 | Newman |
| 8,560,406 | B1 | 10/2013 | Antony |
| 8,755,930 | B2 | 6/2014 | Miller |
| 8,882,432 | B2 | 11/2014 | Bastianii |
| 8,920,098 | B2 | 12/2014 | Joachim |
| 9,052,992 | B2 | 6/2015 | Irwin |
| 9,082,247 | B2 | 7/2015 | Turner |
| 9,120,524 | B2 | 9/2015 | Ozaki |
| 9,120,624 | B1 | 9/2015 | Cassady |
| 9,230,230 | B2 | 1/2016 | Gupta |
| 9,242,810 | B2 | 1/2016 | Remi |
| 9,443,372 | B2 | 9/2016 | Mockus |
| 9,482,522 | B2 | 11/2016 | Motoyama |
| 9,516,974 | B2 | 12/2016 | Herling |
| 9,517,296 | B2 | 12/2016 | Fulkerson |
| 9,604,259 | B2 | 3/2017 | Lossov |
| 9,646,280 | B2 | 5/2017 | Thomas |
| 9,821,960 | B2 | 11/2017 | Issing |
| 9,830,572 | B2 | 11/2017 | Wan |
| 9,984,520 | B1 | 5/2018 | Heller |
| 10,019,593 | B1 | 7/2018 | Patel |
| 10,019,693 | B2 | 7/2018 | Wolf |
| 10,043,151 | B1 | 8/2018 | Zhu |
| 10,114,996 | B2 | 10/2018 | Lossov |
| 10,187,542 | B1 | 1/2019 | Fielding |
| 10,303,133 | B1 | 5/2019 | Dhalla |
| 10,357,804 | B2 | 7/2019 | Must |
| 10,621,401 | B2 | 4/2020 | Lossov |
| 11,397,910 | B2 | 7/2022 | Durkee |
| 2002/0032501 | A1 | 3/2002 | Tilles |
| 2002/0035515 | A1* | 3/2002 | Moreno ............... B65G 1/0485 340/5.73 |
| 2002/0165787 | A1 | 11/2002 | Bates |
| 2003/0038097 | A1 | 2/2003 | Palder |
| 2003/0046166 | A1 | 3/2003 | Liebman |
| 2003/0065421 | A1 | 4/2003 | Didriksen |
| 2003/0065898 | A1 | 4/2003 | Flamma |
| 2003/0093333 | A1 | 5/2003 | Veeneman |
| 2004/0037680 | A1 | 2/2004 | Sato |
| 2004/0069572 | A1 | 4/2004 | Jaspers |
| 2004/0175258 | A1 | 9/2004 | Haas |
| 2004/0238326 | A1 | 12/2004 | Lichti |
| 2004/0260665 | A1 | 12/2004 | Hamilton |
| 2005/0000974 | A1 | 1/2005 | Chirnomas |
| 2005/0021173 | A1 | 1/2005 | Pinney |
| 2005/0038712 | A1 | 2/2005 | Veeneman |
| 2005/0053450 | A1 | 3/2005 | Kantola |
| 2005/0211768 | A1 | 9/2005 | Stillman |
| 2006/0045660 | A1 | 3/2006 | Di Rosa |
| 2007/0025830 | A1 | 2/2007 | Solomon |
| 2007/0032903 | A1 | 2/2007 | Tsujimoto |
| 2007/0150375 | A1 | 6/2007 | Yang |
| 2007/0187183 | A1 | 8/2007 | Saigh |
| 2007/0284442 | A1* | 12/2007 | Herskovitz ......... G07F 17/0092 235/383 |
| 2007/0293978 | A1 | 12/2007 | Wurman |
| 2008/0135574 | A1 | 6/2008 | Hieb |
| 2008/0260504 | A1 | 10/2008 | Gifford |
| 2009/0211962 | A1 | 8/2009 | Min |
| 2010/0076591 | A1 | 3/2010 | Lert, Jr. |
| 2010/0138037 | A1 | 6/2010 | Adelberg |
| 2010/0253190 | A1 | 10/2010 | Li |
| 2011/0178633 | A1 | 7/2011 | Marrese |
| 2012/0024160 | A1 | 2/2012 | Van Os |
| 2012/0027547 | A1 | 2/2012 | Erich |
| 2012/0123587 | A1 | 5/2012 | Mockus |
| 2012/0303154 | A1 | 11/2012 | Stiernagle |
| 2013/0092700 | A1 | 4/2013 | Braunstein |
| 2013/0131863 | A1 | 5/2013 | Hoersten |
| 2013/0167311 | A1 | 7/2013 | Johnson |
| 2013/0184854 | A1 | 7/2013 | Bastian, II |
| 2013/0238115 | A1 | 9/2013 | Smith |
| 2014/0021253 | A1 | 1/2014 | Carson |
| 2014/0037404 | A1 | 2/2014 | Hancock |
| 2014/0079518 | A1 | 3/2014 | Qi |
| 2014/0089085 | A1 | 3/2014 | Mueller |
| 2014/0100942 | A1 | 4/2014 | Konevic |
| 2014/0190914 | A1 | 7/2014 | Nagel |
| 2014/0278603 | A1 | 9/2014 | Lievens |
| 2014/0316916 | A1 | 10/2014 | Hay |
| 2014/0330603 | A1 | 11/2014 | Corder |
| 2015/0032252 | A1 | 1/2015 | Galluzzo |
| 2015/0034713 | A1 | 2/2015 | Jones |
| 2015/0088731 | A1 | 3/2015 | Ackerman |
| 2015/0106291 | A1 | 4/2015 | Robinson |
| 2015/0106295 | A1 | 4/2015 | Robinson |
| 2015/0106296 | A1 | 4/2015 | Robinson |
| 2015/0120094 | A1 | 4/2015 | Kimchi |
| 2015/0120602 | A1 | 4/2015 | Huffman |
| 2015/0158679 | A1 | 6/2015 | Remi |
| 2015/0186840 | A1 | 7/2015 | Torres |
| 2015/0265124 | A1 | 9/2015 | Chen |
| 2015/0266672 | A1 | 9/2015 | Lert |
| 2015/0310694 | A1 | 10/2015 | Will |
| 2015/0339625 | A1 | 11/2015 | Agasti |
| 2015/0343494 | A1 | 12/2015 | Lossov |
| 2015/0356664 | A1 | 12/2015 | Mackler |
| 2015/0371187 | A1 | 12/2015 | Irwin |
| 2015/0379464 | A1 | 12/2015 | Turner |
| 2015/0379554 | A1 | 12/2015 | Copeland |
| 2016/0125508 | A1 | 5/2016 | Carr |
| 2016/0130086 | A1 | 5/2016 | Yamashita |
| 2016/0194152 | A1 | 7/2016 | Lo Iacono |
| 2016/0229633 | A1 | 8/2016 | Yamashita |
| 2016/0236865 | A1 | 8/2016 | Altemir |
| 2016/0247702 | A1 | 8/2016 | Adachi |
| 2016/0327941 | A1 | 11/2016 | Stiernagle |
| 2017/0010609 | A1 | 1/2017 | High |
| 2017/0073159 | A1 | 3/2017 | Lossov |
| 2017/0088355 | A1 | 3/2017 | Khodl |
| 2017/0091704 | A1 | 3/2017 | Wolf |
| 2017/0091710 | A1 | 3/2017 | Van Dyke |
| 2017/0124547 | A1 | 5/2017 | Natarajan |
| 2017/0147975 | A1 | 5/2017 | Natarajan |
| 2017/0200117 | A1* | 7/2017 | High ..................... G06F 3/1423 |
| 2017/0323250 | A1 | 11/2017 | Lindbo |
| 2018/0014438 | A1 | 1/2018 | Bilato |
| 2018/0041493 | A1 | 2/2018 | Wilkinson |
| 2018/0060800 | A1 | 3/2018 | Robinson |
| 2018/0060812 | A1 | 3/2018 | Robinson |
| 2018/0068139 | A1 | 3/2018 | Aalund |
| 2018/0089619 | A1 | 3/2018 | High |
| 2018/0121873 | A1 | 5/2018 | Walsh |
| 2018/0130017 | A1 | 5/2018 | Gupte |
| 2018/0135337 | A1 | 5/2018 | Johnson |
| 2018/0144296 | A1 | 5/2018 | Engel |
| 2018/0172799 | A1 | 6/2018 | Meadow |
| 2018/0174101 | A1 | 6/2018 | Mattingly |
| 2018/0177318 | A1 | 6/2018 | Chambers |
| 2018/0186454 | A1 | 7/2018 | Luckay |
| 2018/0190062 | A1 | 7/2018 | Robinson |
| 2018/0244469 | A1 | 8/2018 | Testa |
| 2018/0251302 | A1 | 9/2018 | Valinsky |
| 2018/0300679 | A1 | 10/2018 | Mahmood |
| 2018/0305125 | A1 | 10/2018 | Guo |

(56) References Cited

U.S. PATENT DOCUMENTS

| | | |
|---|---|---|
| 2018/0365641 A1 | 12/2018 | Zhu |
| 2019/0012639 A1 | 1/2019 | Boothman |
| 2019/0024302 A1 | 1/2019 | Jang |
| 2019/0031441 A1 | 1/2019 | Jin |
| 2019/0112119 A1 | 4/2019 | Alexander |
| 2019/0114585 A1 | 4/2019 | Fee |
| 2019/0114859 A1 | 4/2019 | Fee |
| 2019/0147397 A1 | 5/2019 | Hodges |
| 2019/0188936 A1 | 6/2019 | Sivill |
| 2019/0213540 A1 | 7/2019 | Petroski |
| 2019/0220815 A1 | 7/2019 | Nelson |
| 2019/0313828 A1 | 10/2019 | Schmider |
| 2019/0337719 A1 | 11/2019 | Tovey |
| 2019/0344965 A1 | 11/2019 | Wilkinson |
| 2019/0352095 A1 | 11/2019 | Tovey |
| 2019/0370744 A1 | 12/2019 | Fee |
| 2019/0375594 A1 | 12/2019 | Tovey |
| 2020/0002093 A1 | 1/2020 | Tovey |
| 2020/0005226 A1 | 1/2020 | Sikka |
| 2020/0012245 A1 | 1/2020 | Marin Pulido |
| 2020/0017298 A1 | 1/2020 | Durkee |
| 2020/0017299 A1 | 1/2020 | Durkee |
| 2020/0017300 A1 | 1/2020 | Durkee |
| 2020/0019929 A1 | 1/2020 | Chaney |
| 2020/0172337 A1 | 6/2020 | Wilkinson |
| 2020/0193373 A1 | 6/2020 | Varman |
| 2020/0226539 A1 | 7/2020 | Durkee |
| 2020/0239229 A1 | 7/2020 | Tovey |
| 2020/0250614 A1 | 8/2020 | Zhu |
| 2020/0250615 A1 | 8/2020 | Fee |
| 2020/0293990 A1 | 9/2020 | Mak |
| 2020/0317446 A1 | 10/2020 | Tovey |
| 2020/0394375 A1 | 12/2020 | Lõssov |
| 2021/0074100 A1 | 3/2021 | Kashi |
| 2021/0142277 A1 | 5/2021 | Fee |
| 2022/0127078 A1 | 4/2022 | Durkee |
| 2022/0250840 A1 | 8/2022 | Wilkinson |
| 2022/0292453 A1 | 9/2022 | Durkee |
| 2022/0306385 A1 | 9/2022 | Tovey |
| 2022/0309456 A1 | 9/2022 | Durkee |

FOREIGN PATENT DOCUMENTS

| | | | | |
|---|---|---|---|---|
| CN | 107454863 | | 12/2017 | |
| CN | 107814122 | | 3/2018 | |
| DE | 4339056 | | 5/1995 | |
| EM | 0021045470001 | | 9/2012 | |
| EM | 0027572450001 | | 8/2015 | |
| EM | 0027572450002 | | 8/2015 | |
| EM | 0027572450003 | | 8/2015 | |
| EM | 0036406890001 | | 1/2017 | |
| EM | 0037930660001 | | 3/2017 | |
| EM | 0034029650001 | | 7/2017 | |
| EM | 0041697610001 | | 8/2017 | |
| EP | 2881905 | | 6/2015 | |
| EP | 2950282 | | 12/2015 | |
| EP | 3142085 | | 3/2017 | |
| EP | 3255596 | | 12/2017 | |
| GB | 2175575 | A | 12/1986 | |
| GB | 2409748 | | 7/2005 | |
| GB | 2430608 | | 4/2007 | |
| GB | 2430705 | | 4/2007 | |
| GB | 2437967 | | 11/2007 | |
| GB | 2491340 | | 12/2012 | |
| GB | 2564313 | | 1/2019 | |
| GB | 2590246 | | 6/2021 | |
| GB | 2590248 | | 6/2021 | |
| GB | 2590267 | | 6/2021 | |
| GB | 2590268 | | 6/2021 | |
| JP | 2017048014 | A | 3/2017 | |
| JP | 2017048014 | A * | 3/2017 | ........... A47G 29/141 |
| WO | 1995011829 | | 5/1995 | |
| WO | 1998007641 | | 2/1998 | |
| WO | 2001018395 | | 3/2001 | |
| WO | 2001097101 | | 12/2001 | |
| WO | 2002007021 | | 1/2002 | |
| WO | 2002074634 | | 9/2002 | |
| WO | 2003046782 | | 6/2003 | |
| WO | 2006136108 | A1 | 12/2006 | |
| WO | 2008104731 | | 9/2008 | |
| WO | 2015019377 | | 2/2015 | |
| WO | 2015037923 | A1 | 3/2015 | |
| WO | 2015044692 | | 4/2015 | |
| WO | 2016176464 | A1 | 11/2016 | |
| WO | 2017081550 | | 5/2017 | |
| WO | 2017163018 | | 9/2017 | |
| WO | 2019212853 | | 11/2019 | |
| WO | 2019222246 | | 11/2019 | |
| WO | 2020014373 | | 1/2020 | |
| WO | 2020014374 | | 1/2020 | |
| WO | 2020014608 | | 1/2020 | |
| WO | 2020014615 | | 1/2020 | |
| WO | 2020092790 | | 5/2020 | |
| WO | 2020118227 | | 6/2020 | |

OTHER PUBLICATIONS

Drew Menard, "New high-tech book retrieval system enhances library resources", Jul. 19, 2013, liberty.edu, 6 pages (Year: 2013).*
Agarwal, Vlvek, Report: Assessing the benefits of Auto-ID Technology in the Consumer Goods Industry, Cambridge University Auto ID center, University of Cambridge. (Year: 2001).
Benofficial, Walmart's new Cleveron Pickup Machine in action, 3p, Dec. 21, 2017, Youtube, https://www.youtube.com/watch?v=c6amWJISqH0, retrieved Jul. 8, 2020.
Benofficial; "Walmart's new Cleveron pickup machine in action"; <youtube.com>; Dec. 21, 2017; pp. 1-5.
Boeing Invests in Matternet, Matternet, https://mttr.net/, Jun. 26, 2018, 4 pages.
Channel 8 KLKN-TV, Walmart unveils pick up tower, published Jun. 29, 2018, retrieved from <https://www.youtube.com/watch?v=P8HOrzxT6yE> on Jul. 8, 2020, 2 pages.
Click and collect pickup automation for retail and logistics, Cleveron, https://cleveron.eu/, 2018, 5 pages.
Cleveron AS Automated Parcel Machine PackRobot With Smart Storage System. Product Sheet www.cleveron.eu/packrobot. retrieved from web.archive.org/web/20160910094527/http://www.cleveron.eu/packrobot#videosection. Published at least as early as Sep. 10, 2016, 3 pages.
Cleveron AS, Cleveron 10, published Nov. 15, 2017, retrieved from <https://www.youtube.com/watch?v=gz3WrYa1Zbs> on Jul. 8, 2020, 4 pages.
Cleveron AS, Cleveron highlights the lack of drone delivery legislation at Digital Summit Tallinn, Sep. 26, 2017 https://cleveron.com/news/cleveron-digital-summit; 3p.
Cleveron AS, Cleveron Introduction 2016. published Jun. 14, 2016, retrieved from https://www.youtube.com/watch?v=ly4K_yWCXRg on Jul. 8, 2020, 4 pages.
Cleveron AS, Courier loading operations at Cleveron's Parcel Terminal, published Nov. 6, 2012, retrieved from <https://www.youtube.com/watch?v=qgQ0f-bTQ10> on Jul. 8, 2020, 2 pages.
Cleveron AS, Multiload system of Cleveron's PackRobot, published Sep. 26, 2012, retrieved from <https://www.youtube.com/watch?v=131M3V-8saE> on Jul. 8, 2020, 2 pages.
Cleveron AS, Pack robot Cleveron 401, 5p, Sep. 15, 2015, You-tube, https://www.youtube.com/watch?v =- iyT2hGrF0c, retrieved Jul. 8, 2020.
Cleveron AS, Pack robot Cleveron 401, published Sep. 15, 2015, retrieved from <https://www.youtube.com/watch?v=-iyT2hGrF0c> on Jul. 8, 2020, 2 pages.
Cleveron AS, Smart Post ETV Feb. 28, 2010, published Mar. 16, 2010, retrieved from <https://www.youtube.com/watch?v=K-hNRJGZKEY> on Jul. 8, 2020, 2 pages.
Cleveron AS; SmartPOST ETV Feb. 28, 2010. Mar. 16, 2010, screenshots 2:25, 2:26, 2:35 2p. https://youtu.be/K-hNRJGZKEY, 2 pages.
Cleveron, Automated parcel Machine PackRobot with smart storage system. Product sheet. Published at least as early as Sep. 20, 2016

(56) References Cited

OTHER PUBLICATIONS at www.cleveron.eu/packrobot; and at https://issuu.com/cleveron/docs/pr16002_1_tooteleht on Apr. 10, 2017, 4 pages.
Hointer, The Hointer Experience. Retrieved online at: https://www.youtube.com/watch?v=i9348H-mw4. 2 pages, Mar. 21, 2014.
Intelligent, Intuitive and Interconnected Vending Machings, SAP Blogs, https://blogs.sap.com/2015/04/16/intelligent-intuitive-and-interconnected-vending-machines/, Apr. 16, 2015, 7 pages.
International Search Report and Written Opinion for Application No. PCT/US2019/032263, dated Aug. 6, 2019, 8 pages.
International Search Report and Written Opinion for Application No. PCT/US2019/032893, dated Jul. 29, 2019, 11 pages.
International Search Report and Written Opinion for Application No. PCT/US2019/041222, dated Oct. 9, 2019, 12 pages.
International Search Report and Written Opinion for Application No. PCT/US2019/041223, dated Oct. 8, 2019, 10 pages.
International Search Report and Written Opinion for Application No. PCT/US2019/041596, dated Oct. 9, 2019, 13 pages.
International Search Report and Written Opinion for Application No. PCT/US2019/041599, dated Sep. 30, 2019, 12 pages.
International Search Report and Written Opinion for Application No. PCT/US2019/041610, dated Oct. 9, 2019, 10 pages.
International Search Report and Written Opinion for PCT/US2019/29099, dated Aug. 1, 2019, pp. 1-16.
International Search Report and Written Opinion from related International Patent Application No. PCT/US2019/035814 issued Aug. 22, 2019, 41 pages.
International Search Report and Written Opinion from related International Patent Application No. PCT/US2019/039484 issued Sep. 16, 2019, 18 pages.
International Search Report and Written Opinion from related International Patent Application No. PCT/US2019/044896 issued Oct. 29, 2019, 13 pages.
International Search Report and Written Opinion from related International Patent Application No. PCT/US2019/059197 issued Jan. 17, 2020, 17 pages.
International Search Report and Written Opinion from related International Patent Application No. PCT/US2019/065028 issued Feb. 21, 2020, 12 pages.
K. L. Choy G. T. S. Ho . C. K. H. Lee, A RFID-based storage assignment system for enhancing the efficiency of order picking, Published online: Sep. 19, 2014, J Intell Manuf (2017) 28:111-129 (Year: 2014).
PackRobot: robotics based most efficient parcel terminal, Cleveron, http://cleveron.eu/packrobot/#1490003126030-5c15306f-a9f0, 2017, 9 pages.
Palm, Zara tests out a new kiosk designed to hold packages for customers who make online orders. Retrieved online at: https://www.psfk.com/2018/01/zara-self-service-kiosks-online-orders.html. 6 pages, Jan. 2, 2018.
Peterson, Hayley, Walmart is unleashing 2 key weapons against Amazon in 700 stores. 11 Apr. 5, 2018, 11 pages. https://www.businessinsider.com/walmart-online-pickup-tower-review-2017-8.
Peterson, Walmart is building giant towers to solve the most annoying thing about online ordering. Business insider. Retrieved online at: https://www.businessinsider.in. 8 pages, Jul. 5, 2017.
Simplifying Cloud-Connected Vending Machines, Intelligent Vending with Intel® IoT Retail Gateway, https://www.intel.in/content/www/in/en/embedded/retail/vending/iot-gateway-for-intelligent-vending/overview.html, last viewed Aug. 16, 2018, 4 pages.
Smolnikov, Teleitems Robotic Parcel Terminal Promo, https://www.youtube.com/watch?v=mXL_c50T9Rc, published Jul. 21, 2017, 1 page.
Technology Breaking News, Walmart adds 500 Pickup Towers to its stores across the US, published Apr. 27, 2018, retrieved from <https://www.youtube.com/watch?v=wbrw9BElqrY> on Jul. 8, 2020, 2 pages.
USPTO; U.S. Appl. No. 16/507,988; Final Rejection mailed Aug. 23, 2022; (pp. 1-21).
USPTO; U.S. Appl. No. 16/507,988; Non-Final Rejection mailed Nov. 19, 2021; (pp. 1-20).
USPTO; U.S. Appl. No. 16/507,988; Non-Final Rejection mailed Dec. 22, 2022; (pp. 1-25).
USPTO; U.S. Appl. No. 16/507,988; Notice of Allowance and Fees Due (PTOL-85) mailed May 22, 2023; (pp. 1-15).
USPTO; U.S. Appl. No. 16/507,988; Notice of Allowance and Fees Due (PTOL-85) mailed May 31, 2023; (pp. 1-12).
Vidmar, Stanley, Tower System provides automated storage and retrieval., Mar. 30, 2005, https://news.thomasnet.com/fullstory/tower-system-provides-automated-storage-and-retrieval-461698 (Year: 2005), 5 pages.
ZDNET, Walmart rolls out 500 more vending machines for online order pickups | ZDNet, published Jun. 3, 2018, retrieved from <https://www.youtube.com/watch?v=WtSnq9_CExY> on Jul. 8, 2020, 2 pages.

\* cited by examiner

AUTONOMOUS STORAGE AND RETRIEVAL TOWER

CROSS-REFERENCE TO RELATED PATENT APPLICATIONS

This application is a continuation of U.S. Non-Provisional application Ser. No. 16/507,988, filed Jul. 10, 2019, which claims priority to U.S. Provisional Patent Application No. 62/697,301, filed on Jul. 12, 2018, each of which is hereby incorporated by reference in its entirety.

BACKGROUND

Storage and retrieval towers, also known as automated kiosks or pickup towers, are used in some retail facilities to enable customers to retrieve physical items from the storage and retrieval towers.

BRIEF DESCRIPTION OF THE DRAWINGS

The accompanying drawings, which are incorporated in and constitute a part of this specification, illustrate one or more embodiments of the disclosure and, together with the description, help to explain the disclosure. The drawings are not necessarily to scale, or inclusive of all elements of a system, emphasis instead generally being placed upon illustrating the concepts, structures, and techniques sought to be protected herein. In the drawings.

DETAILED DESCRIPTION

Figure 1:
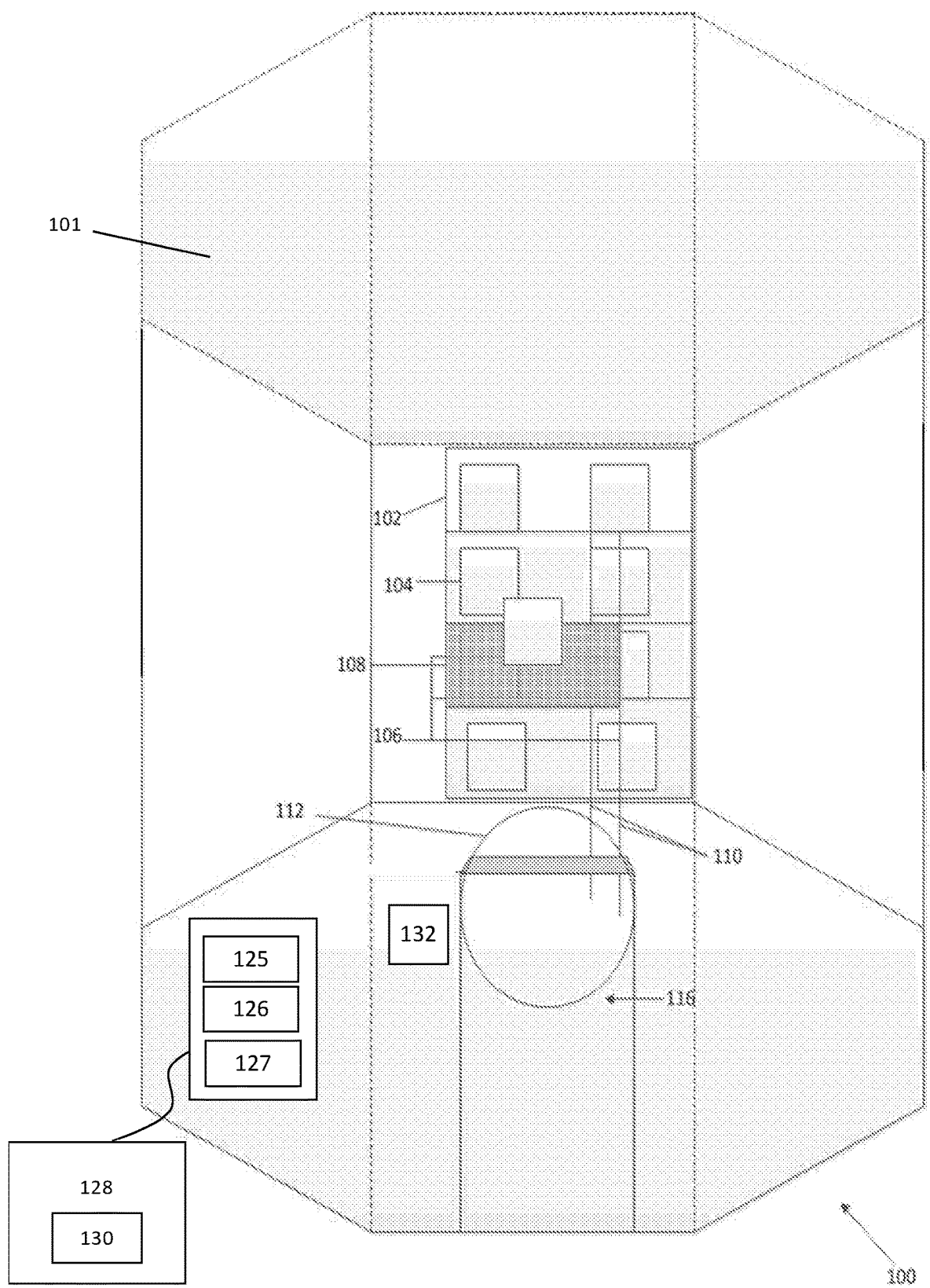
FIG. 1 is a schematic diagram of an interior view of an autonomous storage and retrieval tower in accordance with an example embodiment.

Exemplary embodiments provide an autonomous storage and retrieval tower integrated with a store fulfillment system. A customer may order physical items online and select the "pick-up" option at checkout allowing the customer to pick-up the ordered physical items at a store local to the customer. The ordered physical items are then shipped to the store local to the customer for in-store pick-up via the autonomous storage and retrieval tower. When the ordered physical items arrive at the local store, a store associate may load the ordered physical items into the autonomous storage and retrieval tower. When the customer arrives at the local store, the customer can proceed to the autonomous storage and retrieval tower and enter or scan a code associated with the order. The customer may then promptly receive the ordered physical items dispersed from the autonomous storage and retrieval tower.

The fulfillment system is used to fulfill online orders for physical items. For example, the fulfillment system receives an online order from a customer and transmits the online order to a store local to the customer where the customer can pick-up the ordered physical items.

The fulfillment system further tracks ordered physical items being shipped into the local store for customer in-store pick-up. Upon receipt of the ordered physical items at the local store, a store associate scans and prepares the physical items for in-store pick-up in a process called staging. Staging associates the ordered physical items with one or more locations for future retrieval. The fulfillment system may include a fulfillment database that includes the locations of the ordered physical items. The fulfillment database may further include descriptions, characteristics, prices, pictures, and other pertinent information associated with the physical items. As further explained below, the fulfillment system uses the fulfillment database for tracking the ordered physical items stored within the autonomous storage and retrieval tower.

The autonomous storage and retrieval tower includes a housing and shelving within the housing. Each shelf is configured to support one or more physical items. The autonomous storage and retrieval tower further includes a storage receptacle for receiving physical items to be stored by the autonomous storage and retrieval tower or for dispensing physical items from the autonomous storage and retrieval tower. The autonomous storage and retrieval tower includes an input device for receiving an input from a user for storing and dispensing physical items from the autonomous storage and retrieval tower. The input device may include a keyboard and/or a scanner for receiving the input.

In the exemplary embodiments provided in which the autonomous storage and retrieval tower is integrated with the fulfillment system, the autonomous storage and retrieval tower includes a processing device in communication with the fulfillment system. The processing device is configured to receive input from the input device for storing or dispensing a physical item within the autonomous storage and retrieval tower. The processing device communicates with the fulfillment system regarding the storing or the dispensing of the physical items in the autonomous storage and retrieval tower. The fulfillment system updates the fulfillment database regarding whether a physical item was stored in or dispensed from the autonomous storage and retrieval tower.

In some embodiments, the processing device communicates with the fulfillment system to obtain authorization that physical items are valid for insertion into the autonomous storage and retrieval tower. For example, the processing device transmits a query to the fulfillment system whether an ordered physical item can be staged in the autonomous storage and retrieval tower. The fulfillment system determines whether the ordered physical item can be staged in the autonomous storage and retrieval tower and transmits a response back to the autonomous storage and retrieval tower. If the fulfillment system provides staging authorization to the autonomous storage and retrieval tower, the autonomous storage and retrieval tower accepts and stores the ordered physical item into the autonomous storage and retrieval tower. If the fulfillment system does not provide authorization to the autonomous storage and retrieval tower, the autonomous storage and retrieval tower does not accept the ordered physical item into the autonomous storage and retrieval tower. In further embodiments, the autonomous storage and retrieval tower transmits a notification to a user device associated with a store associate indicating whether the ordered physical item can be stored within the autonomous storage and retrieval tower or whether the ordered physical item is not valid for insertion. The fulfillment system may determine that an ordered physical item cannot be staged in the autonomous storage and retrieval tower due to, for example, the ordered physical item requiring age verification or being recalled.

Similarly, in some embodiments, the processing device communicates with the fulfillment system to obtain authorization that an ordered physical item is valid for dispensing to a customer. For example, the processing device transmits a query to the fulfillment system whether an ordered physical item can be dispensed from the autonomous storage and retrieval tower to the customer. The fulfillment system determines whether the ordered physical item can be dispensed from the autonomous storage and retrieval tower and transmits a response back to the autonomous storage and retrieval tower. If the fulfillment system provides authorization to the autonomous storage and retrieval tower, the autonomous storage and retrieval tower dispenses the ordered physical item from the autonomous storage and retrieval tower to the customer. If the fulfillment system does not provide authorization to the autonomous storage and retrieval tower, the autonomous storage and retrieval tower does not dispense the ordered physical item from the autonomous storage and retrieval tower. In further embodiments, the autonomous storage and retrieval tower transmits a notification to the customer or a store associate whether the ordered physical item can be dispersed from the autonomous storage and retrieval tower or whether the ordered physical item is not valid for dispensing. The fulfillment system may determine that an ordered physical item cannot be dispensed from the autonomous storage and retrieval tower due to age restrictions associated with the ordered physical item, dates and/or times restrictions (for example, hour restrictions associated with the sale of alcohol), and release dates for movies and video games.

In some embodiments, the autonomous storage and retrieval tower includes an application programming interface (API) to communicate with the fulfillment system.

FIG. 1 is a schematic diagram of an interior view of an autonomous storage and retrieval tower 100 (referred to as storage tower 100) in accordance with an exemplary embodiment. The storage tower 100 may be physically located at the front area of a store and used for storing orders for customer pickup. For example, the customer may arrive at a receiving and/or delivery opening 116 and present proof of purchase (e.g., a code) to an input device, and the physical item is dispensed from the storage tower 100 to the customer. The storage tower 100 can include a housing 101. The housing 101 can include, for example, eight interior walls. In some embodiments, the housing can have an octagonal column or octagonal cylinder shape. The interior of the storage tower 100 can include a shelving unit 102, physical items 104 disposed in or on containers 108 on the shelving unit 102, a robotic crane 106, a boom or shaft 110, a rotating base 112, and at least one receiving and/or delivery opening 116 (e.g., a storage receptacle). Containers 108 may be received at the autonomous storage and retrieval tower 100 via a variety of mechanisms such as, but not limited to, a conveyor belt delivering the containers to or through the opening 116. Containers 108 may be inserted into the storage tower 100 or dispensed from the storage tower 100 through the opening 116. The shelving unit 102 can include shelves configured to store and support containers holding physical items 104. The shelving unit 102 can be disposed along one or each of the interior walls of the storage tower 100. The shaft 110 can extend vertically within the housing 101 in a cavity surrounded by the shelves. In some embodiments, the shaft 110 can extend along a central axis of the housing. The robotic crane 106 can extend perpendicularly from the shaft 110. The robotic crane 106 is configured to traverse the shaft 110 to store and retrieve containers 108 on the shelving unit 102. The rotating base 112 can be configured to rotate the shaft 110, 360 degrees, around the interior of the storage tower 100 so that the shaft 112 is perpendicular to the appropriate shelving unit 102 containing a physical item 104. The robotic crane 106 can move up and down vertically along the shaft 110 to align itself with the shelf on which a physical item 104 is disposed. The robotic crane 106 can receive instructions from a processing device 125 to load a physical item 104 from the shelving unit 102 (or its container) onto the robotic crane 106 and transport the physical item 104 to the opening 116 or to retrieve a physical item 104 from the opening 116 to load the physical item 104 onto a shelving unit 102 for storage in the storage tower 100. In an exemplary embodiment, the storage tower 100 includes and/or is in communication with an application programming interface (API) 126. The API 126 is in communication with a fulfillment server 128 within the fulfillment system and enables the fulfillment server 128 to interact with the storage tower 100 for tracking physical items within the storage tower 100. The fulfillment server 128 may also include an API 130 for interacting with the storage tower 100. The storage tower 100 may further includes a database 127 for storing data and locations associated with physical items stored within the storage tower 100. The storage tower 100 includes an input device 132 for entering item information associated with storing and dispensing physical items from the storage tower 100. The input device 132 may be a hardware-implemented and/or software-implemented module configured to receive input via a keyboard or a scanner, where the input is associated with storing and/or dispensing physical items within the storage tower 100. For example, in one embodiment, when storing a physical item within the storage tower 100, the physical item has a machine-readable identifier, which the input device 132 reads and uses to identify the physical item and assign the physical item a location within the storage tower 100. In another embodiment, when retrieving a physical item from the storage tower 100, a customer has a machine-readable identifier, which the input device 132 reads and uses to identify the physical item and the corresponding location of the physical item within the storage tower 100.

Figure 2:
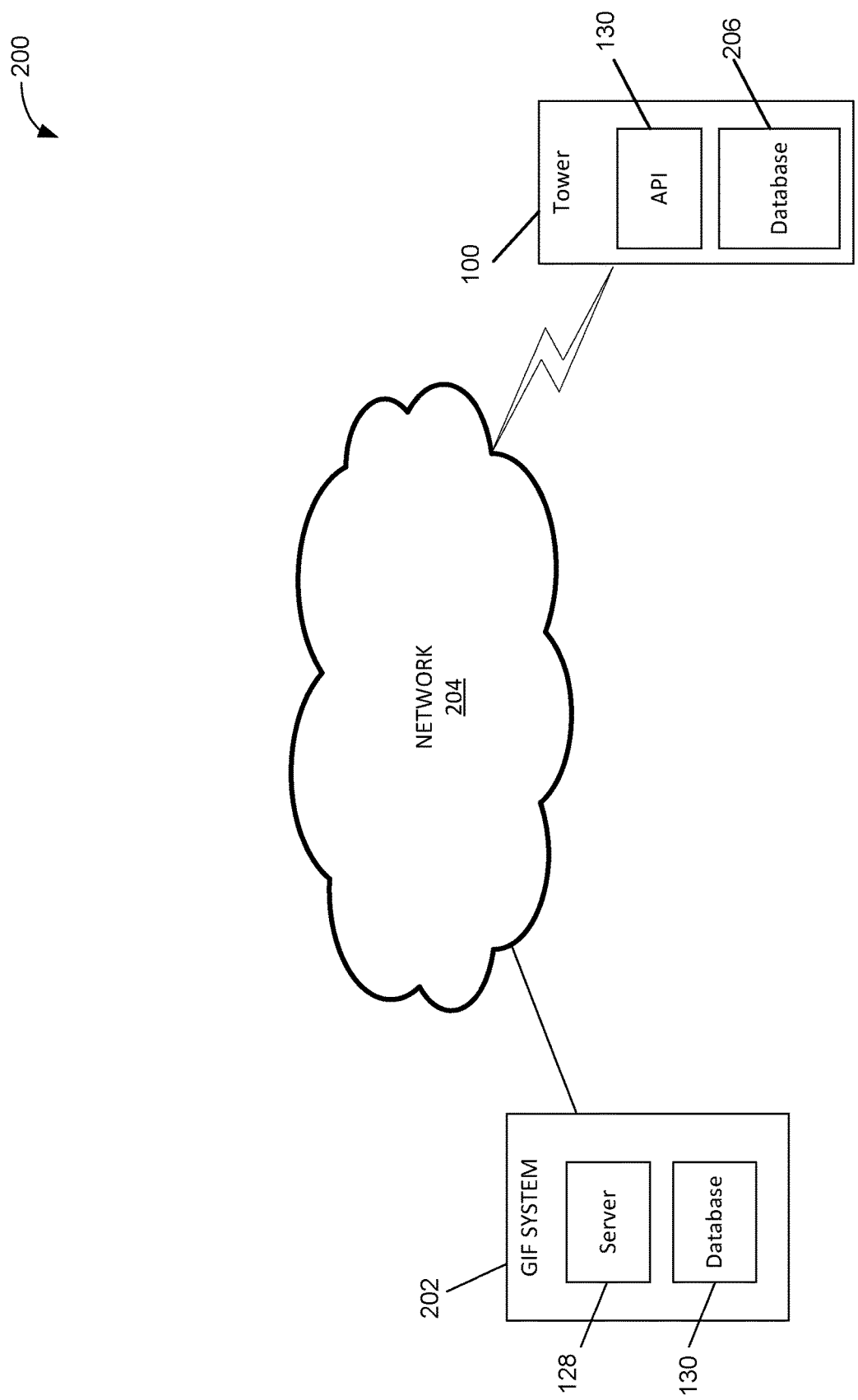
FIG. 2 illustrates a network diagram depicting a system for implementing the autonomous storage and retrieval tower in accordance with an example embodiment.

FIG. 2 illustrates a network diagram depicting a system 200 for implementing the autonomous storage and retrieval tower 100, according to an example embodiment. The system 200 can include an autonomous storage and retrieval tower 100, a fulfillment system 202 including a server 128, and a network 204. Each of the autonomous storage and retrieval tower 100 and the fulfillment system 202 is in communication with the network 204 and may connect to network 204 via a wired or wireless connection. The server 128 comprises one or more computers or processors configured to communicate with the autonomous storage and retrieval tower 100 via network 204. The server 128 can include one or more components of device 500 of FIG. 5.

In an example embodiment, one or more portions of network 204 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Server 128 hosts one or more software systems, applications or websites, including one or more components of the fulfillment system 202 described herein. In an example embodiment, the server 128 also includes various software services that facilitate the functionalities of the fulfillment system 202.

The autonomous storage and retrieval tower 100 includes and/or is in communication with an application programming interface (API) 130. The API 130 is in communication with a fulfillment server 128 and enables the fulfillment server 128 to interact with the storage tower 100 for tracking physical items within the storage tower 100. In some embodiments, the fulfillment server 128 may also include an API.

In some embodiments, the storage tower 100 includes a database 206 local to the storage tower 100.

Figure 3A:
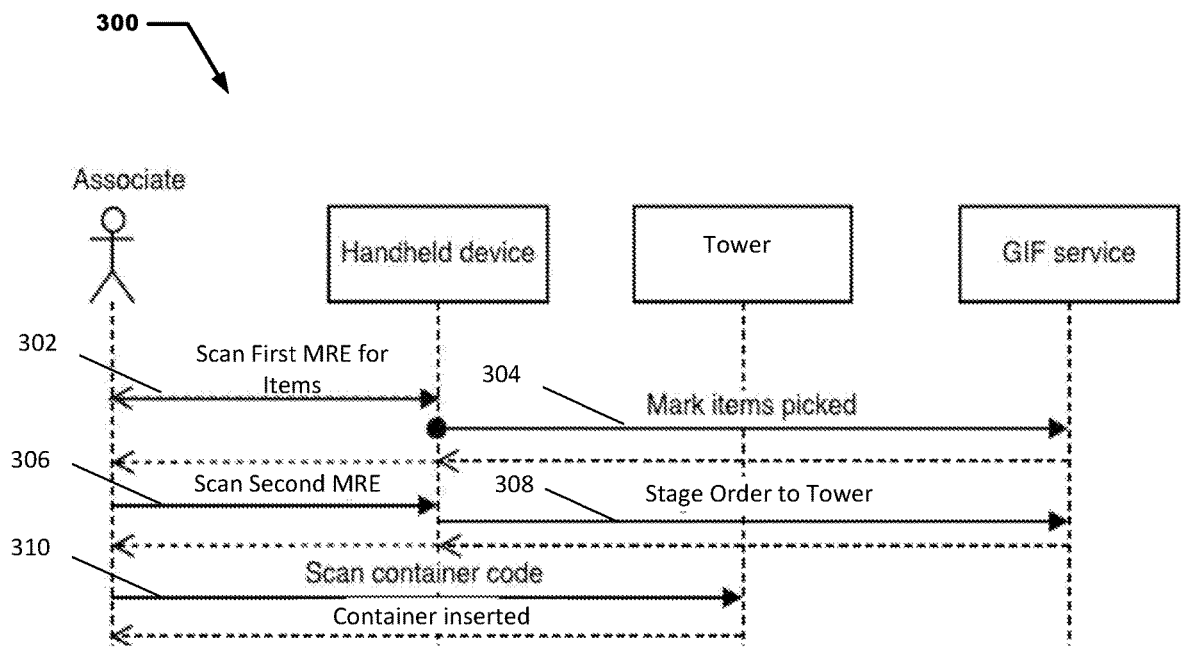
FIGS. 3A-3B illustrate non-integrated staging workflows implemented with the autonomous storage and retrieval tower in accordance with an example embodiment.
Figure 3B:
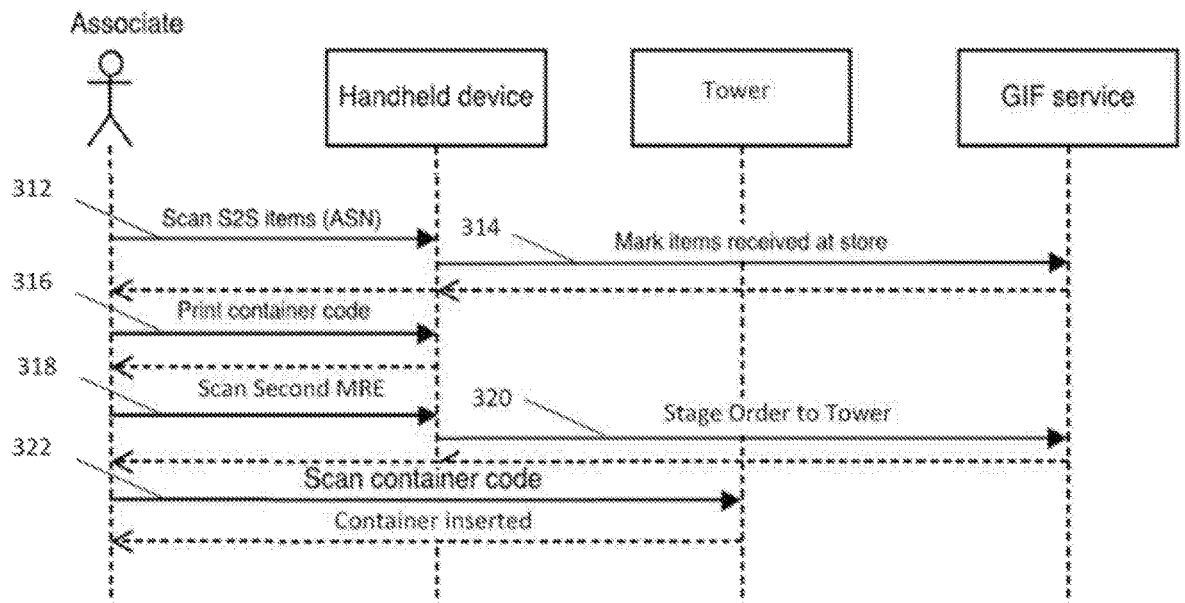

FIGS. 3A and 3B illustrate non-integrated staging workflows 300 in accordance with an exemplary embodiment. In the non-integrated staging workflow 300, the storage tower and the fulfillment system do not communicate and the storage tower is unaware of the fulfillment system. Rather, the storage tower simply stores and retrieves physical items based on identifiers. A mobile computing device is used to notify the fulfillment system that a physical item is located in the storage tower. As described in further detail below, ordered physical items are first staged in the fulfillment system and then inserted for storage into the storage tower.

FIG. 3A illustrates a non-integrated staging workflow when the local store is in possession of the ordered physical items. At step 302, a store associate uses a mobile computing device to scan at least one first machine readable element (MRE) associated with at least one ordered physical item for in-store pick-up. For example, the mobile computing device scans a universal product code (UPC) for each physical item in the order.

At step 304, the mobile computing device transmits a notification to the fulfillment system that the ordered physical item has been picked by the store associate for in-store pick-up.

At step 306, the mobile computing device scans a second machine readable element attached to or within the vicinity of the storage tower. The second machine readable element is used to stage ordered physical items from the fulfillment system to the storage tower. The second machine readable element identifies the storage tower. For example, the second machine readable element may include an identifier associated with the storage tower and/or a storage tower location. In one embodiment, the second machine readable element is a barcode encoded with the identifier and/or the location. The barcode may be attached to the storage tower.

At step 308, the mobile computing device transmits a notification to the fulfillment system that the ordered physical item has been staged in the storage tower. The notification staging the ordered physical item in the storage tower notifies the fulfillment system that the ordered physical item has been stored in the storage tower.

At step 310, the store associate uses the input device of the storage tower to enter or scan a container code of a container containing the ordered physical item. The container may be, for example, a tote or box containing the ordered physical item. The container is then inserted and stored in the storage tower for in-store pick-up. The storage tower updates the local database to reflect that the container is stored within the storage tower.

FIG. 3B illustrates a non-integrated staging workflow when the ordered physical item is received in the local store from another fulfillment node (also known as Site To Store or S2S). At step 312, the store associate scans an advance shipment notification (ASN) using the mobile computing device. The ASN is a document that provides detailed information about a delivery, such as when the ordered physical item is received in the local store from the fulfillment node. At step 314, the mobile computing device transmits a notification to the fulfillment system that the local store is now in possession of the ordered physical item. The fulfillment system marks the ordered physical item as received at the local store in the fulfillment database.

At step 316, after the store associate scans the ASN for the ordered physical item, the fulfillment system prints a container label that includes a container code and other item information. The container label may be a machine readable element, such as a barcode. The container label is applied to a container that includes the ordered physical item. The container including the ordered physical item can be tracked using the container code.

At step 318, the store associate scans the second machine readable element attached to or within the vicinity of the storage tower. The second machine readable element is used to stage ordered physical items from the fulfillment system to the storage tower. At step 320, the mobile computing device transmits a notification to the fulfillment system that the ordered physical item has been staged in the storage tower.

At step 322, the store associate scans the container code using the input device of the storage tower. The container is then inserted and stored in the storage tower for in-store pick-up. The storage tower updates the local database to reflect that the container is stored within the storage tower.

Figure 4A:
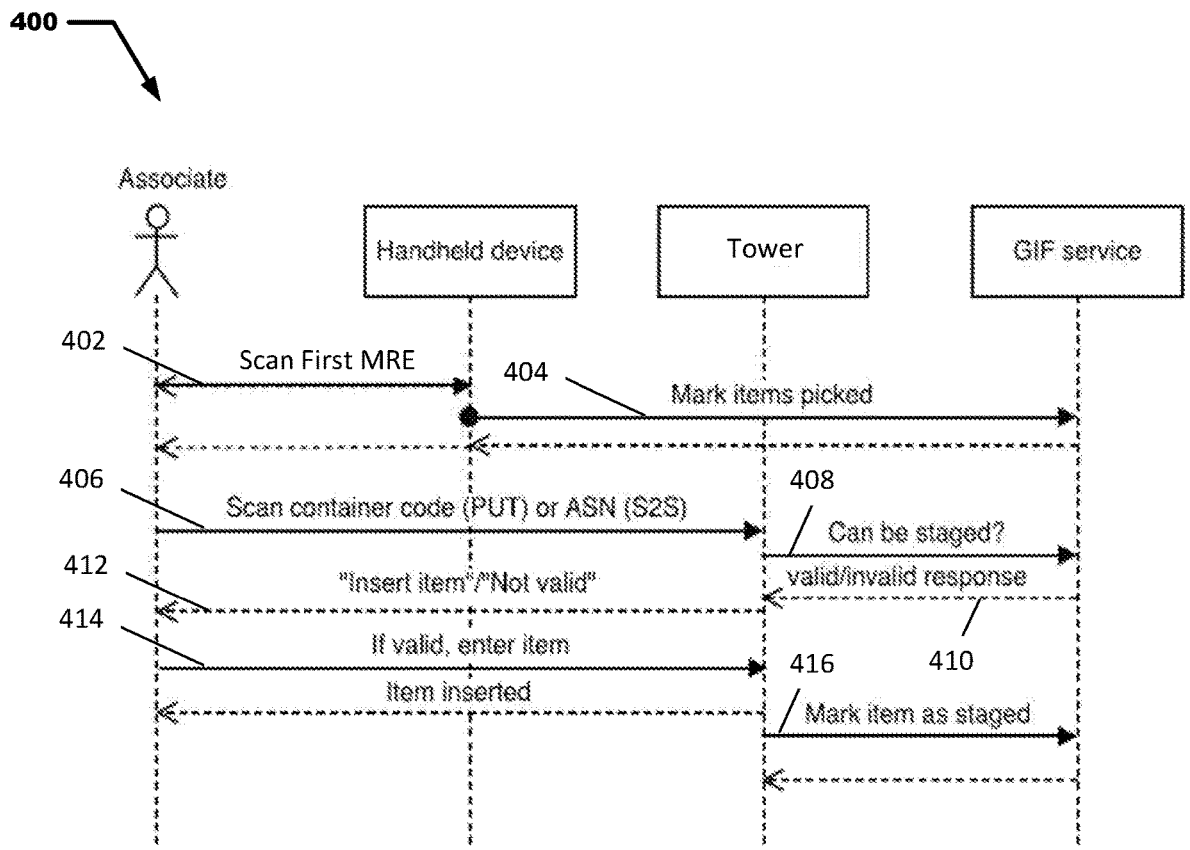
FIGS. 4A-4B illustrate integrated staging workflows implemented with the autonomous storage and retrieval tower in accordance with an example embodiment.
Figure 4B:
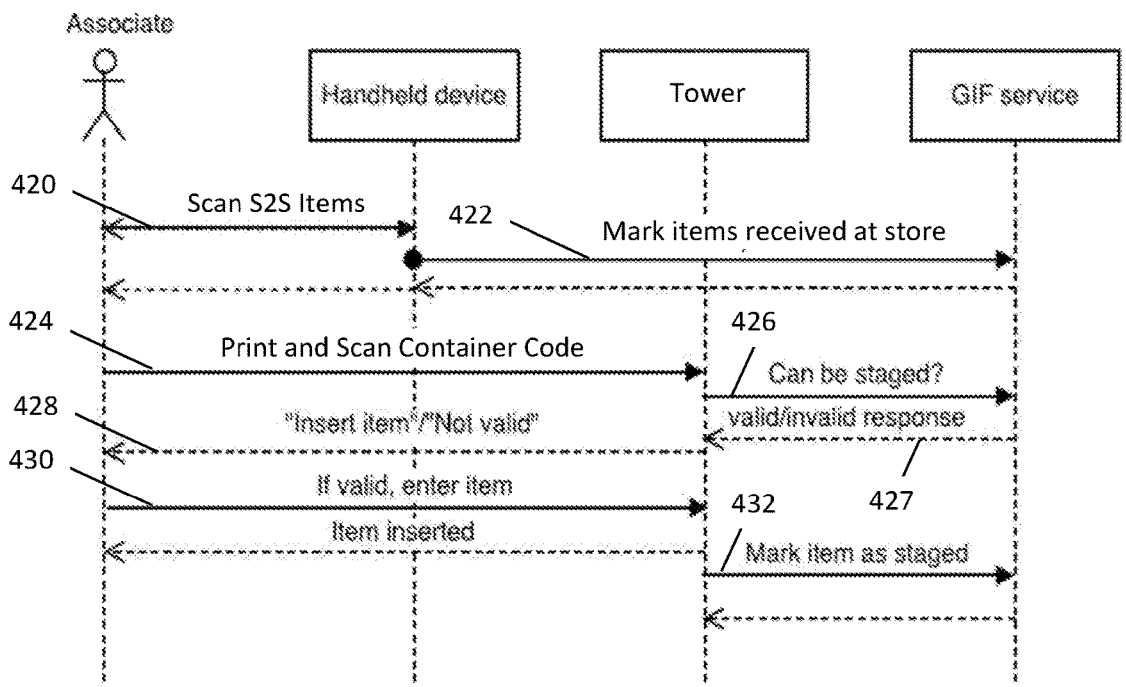

FIGS. 4A and 4B illustrate an integrated staging workflow 400 in accordance with an exemplary embodiment. In the integrated staging workflow 400, the storage tower and the fulfillment system communicate via a network. Accordingly, the storage tower can stage physical items within the storage tower by communicating with the fulfillment system that the physical items are being stored within the storage tower. The order can be inducted into the storage tower without first staging the order in the fulfillment system.

FIG. 4A illustrates an integrated staging workflow when the local store is in possession of the ordered physical items. At step 402, a store associate uses a mobile computing device to scan at least one first computer-readable element associated with at least one ordered physical item for in-store pick-up. For example, the mobile computing device scans a UPC for each physical item in the order.

At step 404, the mobile computing device transmits a notification to the fulfillment system that the ordered physical item has been picked by the store associate for in-store pick-up.

At step 406, the store associate scans an advance shipment notification (ASN) or a container code associated with the ordered physical item using the input device of the storage tower.

Once the container code or the ASN is received at the storage tower, the storage tower validates whether the ordered physical item is eligible for staging in the storage tower. At step 408, the storage tower transmits a query to the fulfillment system whether the ordered physical item can be staged in the storage tower. At step 410, the fulfillment system determines whether the ordered physical item can be staged in the storage tower and transmits a response back to the storage tower. At step 412, the storage tower transmits a notification to the store associate whether the ordered physical item can be inserted and stored within the storage tower or whether the order is not valid for insertion.

At step 414, if the order can be inserted within the storage tower, the storage tower allows insertion and the store associate enters the physical item into the storage tower. At step 416, the storage tower transmits a notification to the fulfillment system that the ordered physical item has been staged in the storage tower.

FIG. 4B illustrates an integrated staging workflow when the ordered physical item is received in the local store from another fulfillment node (also known as Site To Store or S2S).

At step 420, the store associate scans an advance shipment notification (ASN) using the mobile computing device. At step 422, the mobile computing device transmits a notification to the fulfillment system that the local store is now in possession of the ordered physical item. The fulfillment system marks the ordered physical item as received at the local store in the fulfillment database.

At step 424, after the store associate scans the ASN for the ordered physical item, the fulfillment system prints a container label that includes a container code and other item information. The container label may be a machine readable element, such as a barcode. The container label is applied to a container that includes the ordered physical item. The container including the ordered physical item can be tracked using the container code. The store associate scans the container label associated with the ordered physical item using the input device of the storage tower.

Once the container code is received at the storage tower, the storage tower validates whether the ordered physical item is eligible for staging in the storage tower. At step 426, the storage tower transmits a query to the fulfillment system whether the ordered physical item can be staged in the storage tower. At step 427, the fulfillment system determines whether the ordered physical item can be staged in the storage tower and transmits a response back to the storage tower. At step 428, the storage tower transmits a notification to the store associate whether the ordered physical item can be inserted and stored within the storage tower or whether the order is not valid for insertion.

At step 430, if the order can be inserted within the storage tower, the storage tower allows insertion and the store associate enters the physical item into the storage tower. At step 432, the storage tower transmits a notification to the fulfillment system that the ordered physical item has been staged in the storage tower.

Figure 5:
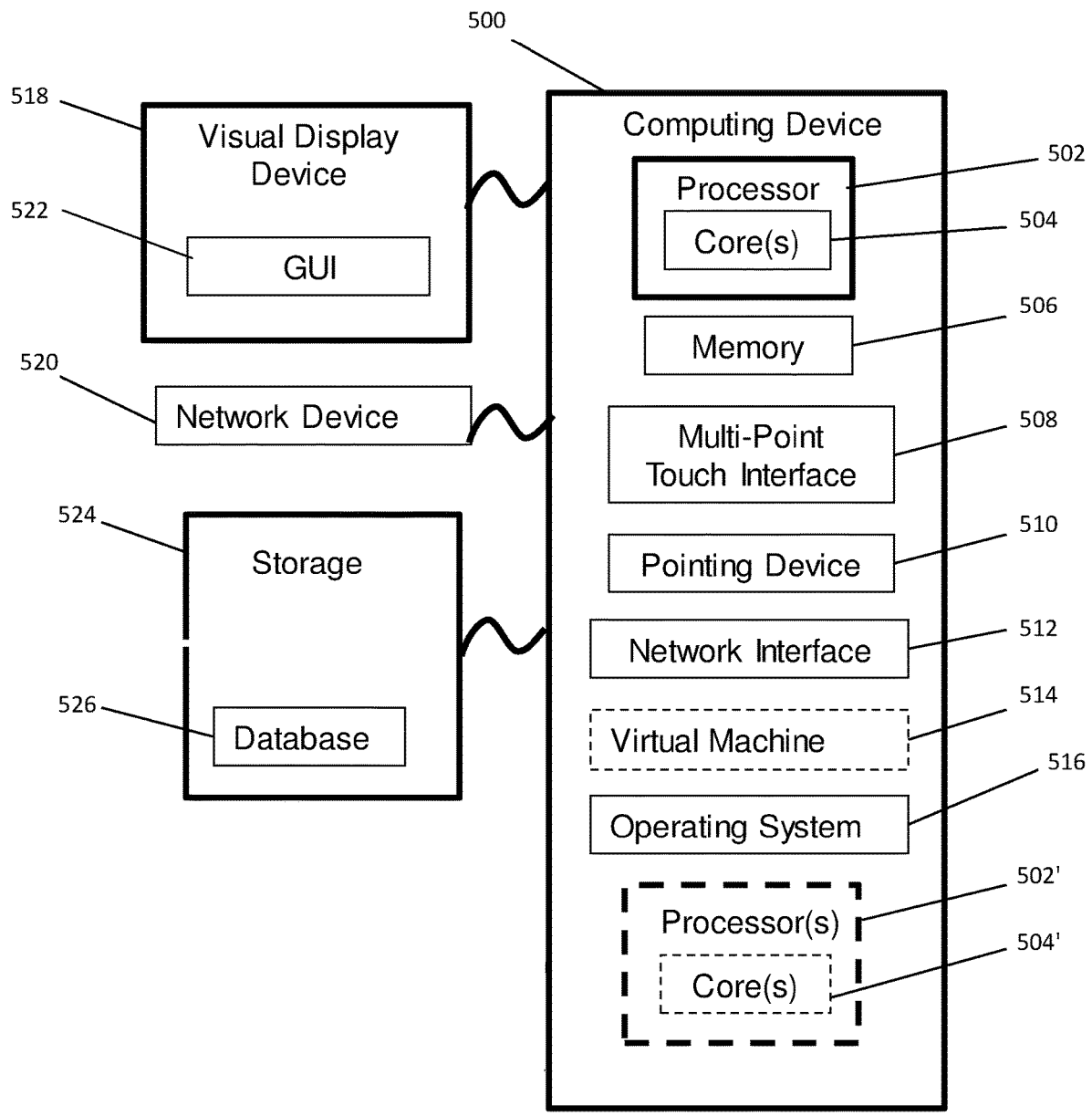
FIG. 5 is a block diagram of an exemplary computing device that may be used to implement example embodiments described herein.

As a result of the integrated staging workflow 400, the store associate no longer needs to double-scan the container code for inserting the ordered physical item into the storage tower. Rather, the container code or the ASN is simply scanned at the storage tower, and the storage tower automatically updates the fulfillment system. In addition, the storage tower is able to validate whether an ordered physical item is eligible for staging in or dispersal from the storage tower FIG. 5 is a block diagram of an exemplary computing device 500 that can be used to perform one or more steps of the methods provided by exemplary embodiments. For example, computing device 500 may be the server 128 and/or include within the storage tower 100 as described in FIG. 2. The computing device 500 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flash-drives), and the like. For example, memory 506 included in the computing device 500 can store computer-readable and computer-executable instructions or software for implementing exemplary embodiments. The computing device 500 also includes processor 502 and associated core 504, and optionally, one or more additional processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' can each be a single core processor or multiple core (504 and 504') processor.

Virtualization can be employed in the computing device 500 so that infrastructure and resources in the computing device can be shared dynamically. A virtual machine 514 can be provided to handle a process running on multiple processors so that the process appears to be using only one computing resource rather than multiple computing resources. Multiple virtual machines can also be used with one processor.

Memory 506 can include a computer system memory or random access memory, such as DRAM, SRAM, EDO RAM, and the like. Memory 506 can include other types of memory as well, or combinations thereof. An individual can interact with the computing device 500 through a visual display device 518, such as a touch screen display or computer monitor, which can display one or more user interfaces 522 for receiving data from the individual. The visual display device 518 can also display other aspects, elements and/or information or data associated with exemplary embodiments. The computing device 500 can include other input devices and I/O devices for receiving input from an individual, for example, a keyboard, a scanner, or another suitable multi-point touch interface 508, a pointing device 510 (e.g., a pen, stylus, mouse, or trackpad). The keyboard 508 and the pointing device 510 can be coupled to the visual display device 518. The computing device 500 can include other suitable conventional I/O peripherals.

The computing device 500 can also include one or more storage devices 524, such as a hard-drive, CD-ROM, or other computer readable media, for storing data and computer-readable instructions and/or software that implements exemplary embodiments of the system as described herein, or portions thereof, which can be executed to generate user interface 519 on display 518. Exemplary storage device 524 can also store one or more databases for storing suitable information required to implement exemplary embodiments. The databases can be updated by an individual or automatically at a suitable time to add, delete, or update one or more items in the databases. Exemplary storage device 524 can store one or more databases 526 for storing data, and other data/information used to implement exemplary embodiments of the systems and methods described herein.

The computing device 500 can include a network interface 512 configured to interface via one or more network devices 522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, processing device area network (CAN), or some combination of any or all of the above. The network interface 512 can include a built-in network adapter, network interface card, PCMCIA network card, card bus network adapter, wireless network adapter, USB network adapter, modem or another device suitable for interfacing the computing device 500 to a type of network capable of communication and performing the operations described herein. Moreover, the computing device 500 can be a computer system, such as a workstation, desktop computer, server, laptop, handheld computer, tablet computer (e.g., the iPad ° tablet computer), mobile computing or communication device (e.g., the iPhone ° communication device), or other form of computing or telecommunications device that is capable of communication and that has sufficient processor power and memory capacity to perform the operations described herein.

The computing device 500 can run an operating system 516, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 516 can be run in native mode or emulated mode. In an exemplary embodiment, the operating system 516 can be run on one or more cloud machine instances.

Figure 6:
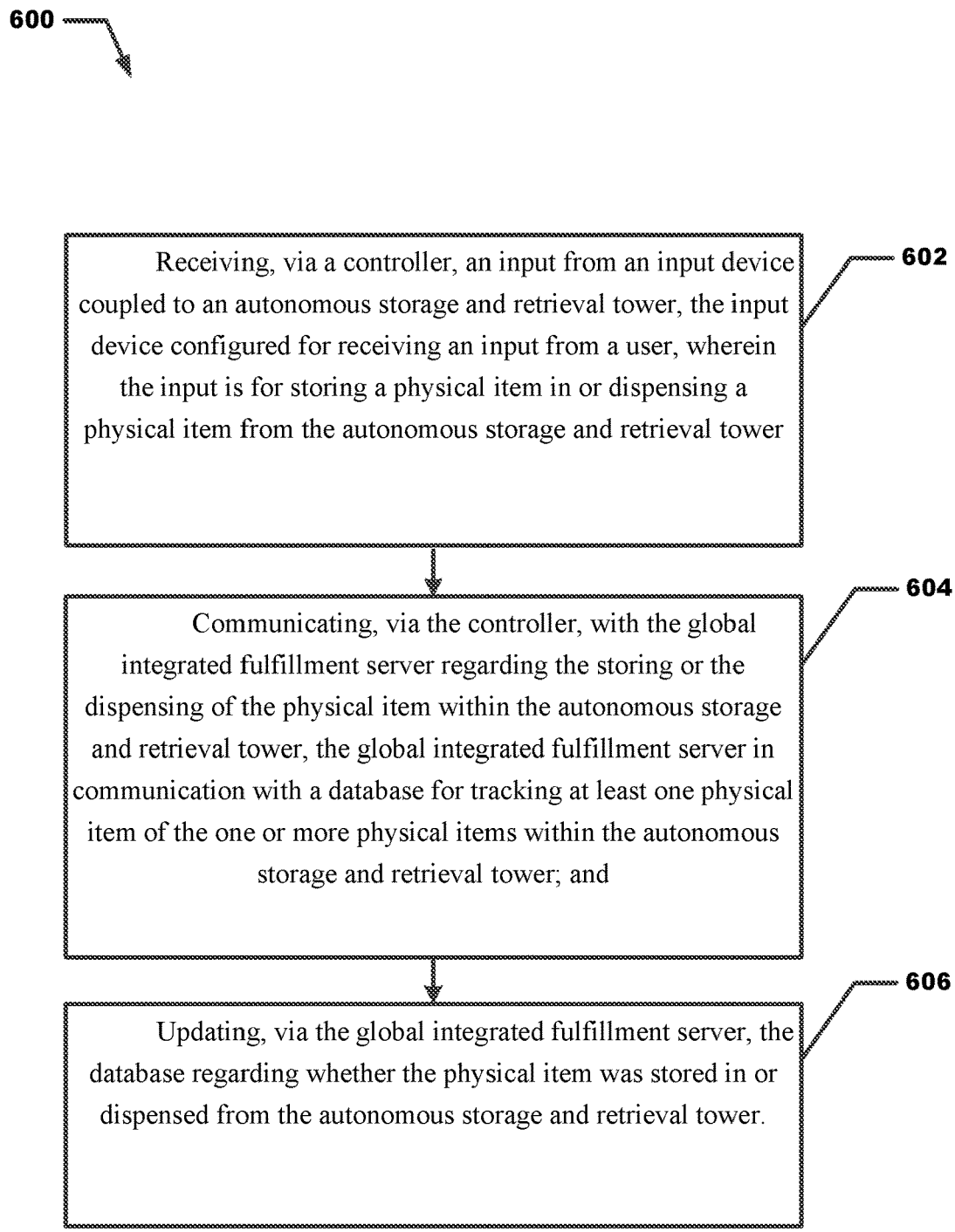
FIG. 6 is a flow diagram showing an illustrative processing that can be implemented with the autonomous storage and retrieval tower in accordance with an example embodiment.

FIG. 6 is a flow diagram showing illustrating an exemplary method 600 for integrating an autonomous storage and retrieval tower with a fulfillment system according to an example embodiment. Rectangular elements are herein denoted "processing blocks" and represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

At step 602, a processing device receives an input from an input device coupled to an autonomous storage and retrieval tower. The input device is configured to receive an input from a user. The input is associated with storing or dispensing a physical item in the autonomous storage and retrieval tower.

At step 604, the processing device communicates with the fulfillment server regarding the storing or the dispensing of the physical item in the autonomous storage and retrieval tower. The fulfillment server is in communication with a database for tracking physical items within the autonomous storage and retrieval tower.

At step 606, the fulfillment server updates the database regarding whether the physical item was stored or dispensed from the autonomous storage and retrieval tower. The physical item is stored or dispensed from the autonomous storage and retrieval tower using a robotic crane configured to traverse a shaft in the autonomous storage and retrieval tower to store and retrieve containers on shelving units. The robotic crane can move up and down vertically along the shaft to align itself with a shelf. A rotating base can be configured to rotate the shaft, 360 degrees, around the interior of the storage tower so that the shaft is perpendicular to the appropriate shelving unit for storing the physical item on the shelving unit or retrieving the physical item from the shelving unit. The robotic crane can receive instructions from the processing device to retrieve the physical item from an opening to load the physical item onto a shelving unit for storage in the storage tower. The robotic crane can further receive instructions from the processing device to load a physical item from the shelving unit (or its container) onto the robotic crane and transport the physical item to the opening.

The description is presented to enable a person skilled in the art to create and use a computer system configuration and related method and systems for integrating an autonomous storage and retrieval tower with a fulfillment system. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component, or step. Likewise, a single element, component, or step can be replaced with a plurality of elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions, and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A system comprising:
   an autonomous storage and retrieval unit, the autonomous storage unit including:
   a housing;
   a container for receiving one or more physical items to be stored by the autonomous storage and retrieval unit or for dispensing the one or more physical items from the autonomous storage and retrieval unit;
   a plurality of storage locations, each of the storage locations configured to support the container containing the one or more physical items;
   a mobile robotic crane configured to place the container containing the one or more physical items onto a given storage location and to remove the container containing the one or more physical items from the given storage location;
   at least one input device for receiving an input from a user for storing or dispensing at least one physical item of the one or more physical items within the autonomous storage and retrieval unit; and
   a processing device configured to:
   receive the input from the at least one input device for the storing of the at least one physical item within the autonomous storage and retrieval unit or the dispensing of the at least one physical item from the autonomous storage and retrieval unit;
   check whether the at least one physical item is valid for the storing in or the dispensing from the autonomous storage and retrieval unit because the at least one physical item does not have a user age restriction, a time of day restriction, or a release date restriction associated therewith, or has at least one of the age restriction, time of day restriction, or release date restriction in association therewith that makes the storing of the at least one physical item in or the dispensing of the at least one physical item from the autonomous storage and retrieval unit invalid, and
   when the at least one physical item is valid for the storing in or the dispensing from the autonomous storage and retrieval unit because the at least one physical item is not associated with the at least one of the age restriction, time of day restriction, or release date restriction, transmit a first instruction to the autonomous storage and retrieval unit to accept and store the at least one physical item in the autonomous storage and retrieval unit or to dispense the at least one physical item from the autonomous storage and retrieval unit,
   wherein the first instruction transmitted by the processing device to the autonomous storage and retrieval unit causes activation of the mobile robotic crane to move a container containing the at least one physical item to one of the plurality of storage locations or to move the container containing the at least one physical item from the one of the plurality of storage locations to dispense the at least one item from the autonomous storage and retrieval unit.

2. The system of claim 1, wherein the autonomous storage and retrieval unit includes an application programming interface (API) configured to communicate with an order fulfillment server.

3. The system of claim 1, wherein, when the at least one physical item is not valid for the storing in or the dispensing from the autonomous storage and retrieval unit because the at least one physical item is not associated with the at least one of the age restriction, time of day restriction, or release date restriction, the processing device is configured to transmit a second instruction to the autonomous storage and retrieval unit to reject and not store the at least one physical item in the autonomous storage and retrieval unit or to not dispense the at least one physical item from the autonomous storage and retrieval unit.

4. The system of claim 1, wherein the processing device is further configured to transmit a notification to a handheld device indicating whether the at least one physical item can be validly stored within the autonomous storage and retrieval unit or validly dispensed from the autonomous storage and retrieval unit.

5. The system of claim 1, wherein the autonomous storage and retrieval unit further comprises a storage receptacle for receiving the one or more physical items to be stored by the autonomous storage and retrieval unit or for dispensing the one or more physical items from the autonomous storage and retrieval unit.

6. The system of claim 1, wherein the autonomous storage and retrieval unit further comprises an electronic database that permits tracking of the one or more physical items within the autonomous storage and retrieval unit.

7. The system of claim 2, wherein the processing device is configured to transmit a query to the order fulfillment server to check whether the at least one physical item is valid for the storing in or the dispensing from the autonomous storage and retrieval unit.

8. The system of claim 7, wherein the order fulfillment server is configured to make a determination of whether the at least one physical item is valid for the storing in or the dispensing from the autonomous storage and retrieval unit.

9. The system of claim 8, wherein the order fulfillment server is configured to transmit an authorization to the autonomous storage and retrieval unit, wherein the authorization permits the autonomous storage and retrieval unit to store the at least one physical item within the autonomous storage and retrieval unit or to dispense the at least one physical item from the autonomous storage and retrieval unit.

10. A method comprising:
    providing an autonomous storage and retrieval unit, the autonomous storage unit including:
    a housing;
    a container for receiving one or more physical items to be stored by the autonomous storage and retrieval unit or for dispensing the one or more physical items from the autonomous storage and retrieval unit;
    a plurality of storage locations, each of the storage locations configured to support the container containing the one or more physical items;
    a mobile robotic crane configured to place the container containing the one or more physical items onto a given storage location and to remove the container containing the one or more physical items from the given storage location;

at least one input device for receiving an input from a user for storing or dispensing at least one physical item of the one or more physical items within the autonomous storage and retrieval unit;

via a processing device:

receiving the input from the at least one input device for the storing of the at least one physical item within the autonomous storage and retrieval unit or the dispensing of the at least one physical item from the autonomous storage and retrieval unit;

checking whether the at least one physical item is valid for the storing in or the dispensing from the autonomous storage and retrieval unit because the at least one physical item does not have a user age restriction, a time of day restriction, or a release date restriction associated therewith, or has at least one of the age restriction, time of day restriction, or release date restriction in association therewith that makes the storing of the at least one physical item in or the dispensing of the at least one physical item from the autonomous storage and retrieval unit invalid, when the at least one physical item is valid for the storing in or the dispensing from the autonomous storage and retrieval unit because the at least one physical item is not associated with the at least one of the age restriction, time of day restriction, or release date restriction, transmitting a first instruction to the autonomous storage and retrieval unit to accept and store the at least one physical item in the autonomous storage and retrieval unit or to dispense the at least one physical item from the autonomous storage and retrieval unit, in response to receipt of the first instruction by the autonomous storage and retrieval unit from the processing device, activating the mobile robotic crane to move a container containing the at least one physical item to one of the plurality of storage locations or to move the container containing the at least one physical item from the one of the plurality of storage locations to dispense the at least one item from the autonomous storage and retrieval unit.

11. The method of claim 10, wherein the autonomous storage and retrieval unit includes an application programming interface (API) configured to communicate with an order fulfillment server.

12. The method of claim 10, further comprising, when the at least one physical item is not valid for the storing in or the dispensing from the autonomous storage and retrieval unit because the at least one physical item is not associated with the at least one of the age restriction, time of day restriction, or release date restriction, transmitting by the processing device a second instruction to the autonomous storage and retrieval unit to reject and not store the at least one physical item in the autonomous storage and retrieval unit or to not dispense the at least one physical item from the autonomous storage and retrieval unit.

13. The method of claim 10, further comprising transmitting, by the processing device, a notification indicating whether the at least one physical item can be validly stored within the autonomous storage and retrieval unit or validly dispensed from the autonomous storage and retrieval unit.

14. The method of claim 10, wherein the autonomous storage and retrieval unit further comprises a storage receptacle for receiving the one or more physical items to be stored by the autonomous storage and retrieval unit or for dispensing the one or more physical items from the autonomous storage and retrieval unit.

15. The method of claim 10, further comprising providing the autonomous storage and retrieval unit further with an electronic database that permits tracking of the one or more physical items within the autonomous storage and retrieval unit.

16. The method of claim 11, further comprising transmitting a query by the processing device to the order fulfillment server to check whether the at least one physical item is valid for the storing in or the dispensing from the autonomous storage and retrieval unit.

17. The method of claim 16, further comprising making a determination by the order fulfillment server of whether the at least one physical item is valid for the storing in or the dispensing from the autonomous storage and retrieval unit.

18. The method of claim 17, further comprising transmitting, by the order fulfillment server, an authorization to the autonomous storage and retrieval unit, wherein the authorization permits the autonomous storage and retrieval unit to store the at least one physical item within the autonomous storage and retrieval unit or to dispense the at least one physical item from the autonomous storage and retrieval unit.

* * * * *